United States Patent [19]

Cheng

[11] Patent Number: 5,216,947
[45] Date of Patent: Jun. 8, 1993

[54] STEAM CASE

[76] Inventor: Peng Y. Cheng, P.O. Box 82-144, Taipei, Taiwan

[21] Appl. No.: 981,291

[22] Filed: Nov. 25, 1992

[51] Int. Cl.⁵ .......................... A47J 27/00; A47J 27/04; A47J 27/13

[52] U.S. Cl. ............................... 99/417; 99/418; 99/448; 126/348; 126/358; 126/369; 126/377; 220/23.83; 220/428

[58] Field of Search .......... 99/403, 410, 413, 415–418, 99/483, 482, 467, 447, 473–476, 448, 450; 126/369, 358, 377, 348, 373, 25 R, 9 R; 220/428, 912, 23.83; 219/401

[56] References Cited

U.S. PATENT DOCUMENTS

| | | | |
|---|---|---|---|
| 115,666 | 6/1871 | Wesche | 126/358 |
| 164,063 | 6/1875 | Welch | 126/369 |
| 322,774 | 7/1885 | Armstrong | 126/369 |
| 507,359 | 10/1893 | Gluck | 126/377 |
| 522,399 | 7/1894 | Beveridge | 126/369 |
| 2,662,965 | 12/1953 | Becker | 99/417 |
| 3,641,926 | 2/1972 | Williams et al. | 99/448 |
| 4,649,811 | 3/1987 | Manganese | 99/417 |
| 4,739,698 | 4/1988 | Allaire | 99/417 |
| 5,069,198 | 12/1991 | Henderson | 126/348 |
| 5,097,753 | 3/1992 | Naft | 99/417 |

FOREIGN PATENT DOCUMENTS

| | | | |
|---|---|---|---|
| 90452 | 2/1961 | Denmark | 126/369 |
| 567822 | 3/1945 | United Kingdom | 99/417 |

*Primary Examiner*—Timothy F. Simone
*Attorney, Agent, or Firm*—Alfred Lei

[57] ABSTRACT

This invention relates to a steam case and in particular to one including an upper container provided with a lid, an intermediate container engaged with a bottom of the upper container and having a tubular member at the center communicating the interior with the exterior thereof, a lower container engaged with the bottom of the intermediate container and having a tubular member at the center communicating the interior with the exterior thereof, a tray engaged with the bottom of the lower layer, a body portion mounted under the tray and having a plurality of legs and a closable gate, a combustion chamber mounted within the body portion, a grease container fitted into the base, a cover mounted on the top of the base, and a disc disposed on the cover, and a rod member binding the upper container, the lid, the intermediate container, the lower container, the tray, and the combustion chamber together.

4 Claims, 6 Drawing Sheets

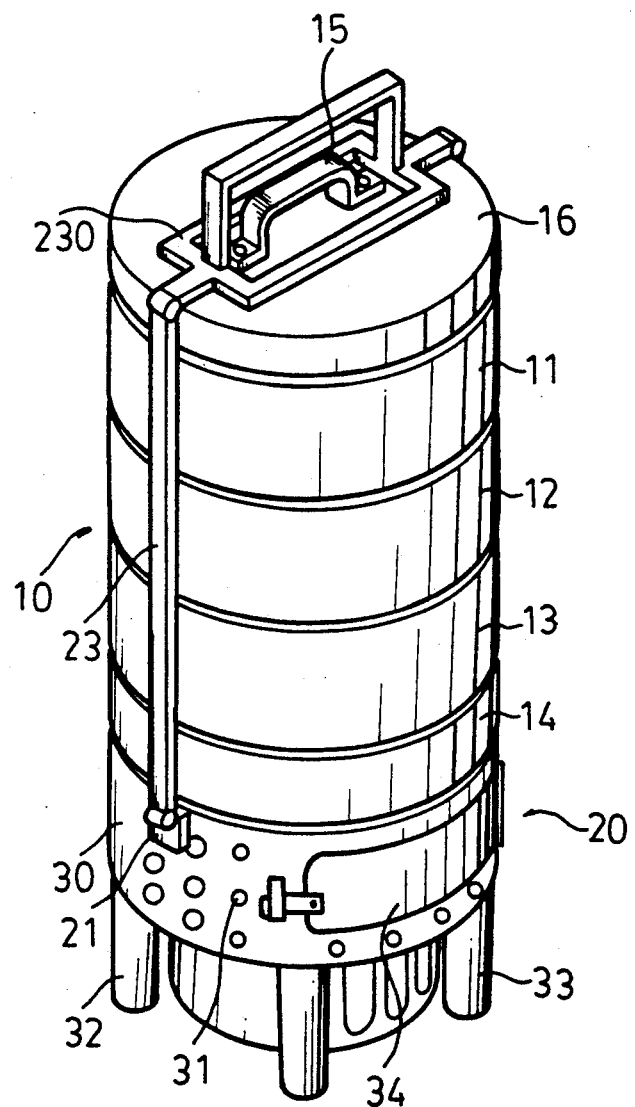
F I G. 1

STEAM CASE

BACKGROUND OF THE INVENTION

It has been found that the prior art heating case or electric cooker for heating food is worked by electricity hence making it become useless in the suburb or in camp. Further, they are inconvenient to carry.

Therefore, it is an object of the present invention to provide a steam case which may obviate and mitigate the above-mentioned drawbacks.

SUMMARY OF THE INVENTION

This invention relates to an improved steam case.

It is the primary object of the present invention to provide a steam case which has a heating device.

It is another object of the present invention to provide a steam case which is convenient to carry.

It is still another object of the present invention to provide a steam case which is energy-saving.

It is still another object of the present invention to provide a steam case which is simple in construction.

It is a further object of the present invention to provide a steam case which is practical in use.

Other objects and merits and a fuller understanding to the present invention wi)1 be obtained by those having ordinary skill in the art when the following detailed description of the preferred embodiment is read in conjunction with the accompanying drawings.

BRIEF DESCRIPTION OF THE DRAWINGS

FIG. 1 is a perspective view of the present invention;

DETAILED DESCRIPTION OF THE PREFERRED EMBODIMENT

Figure 2:
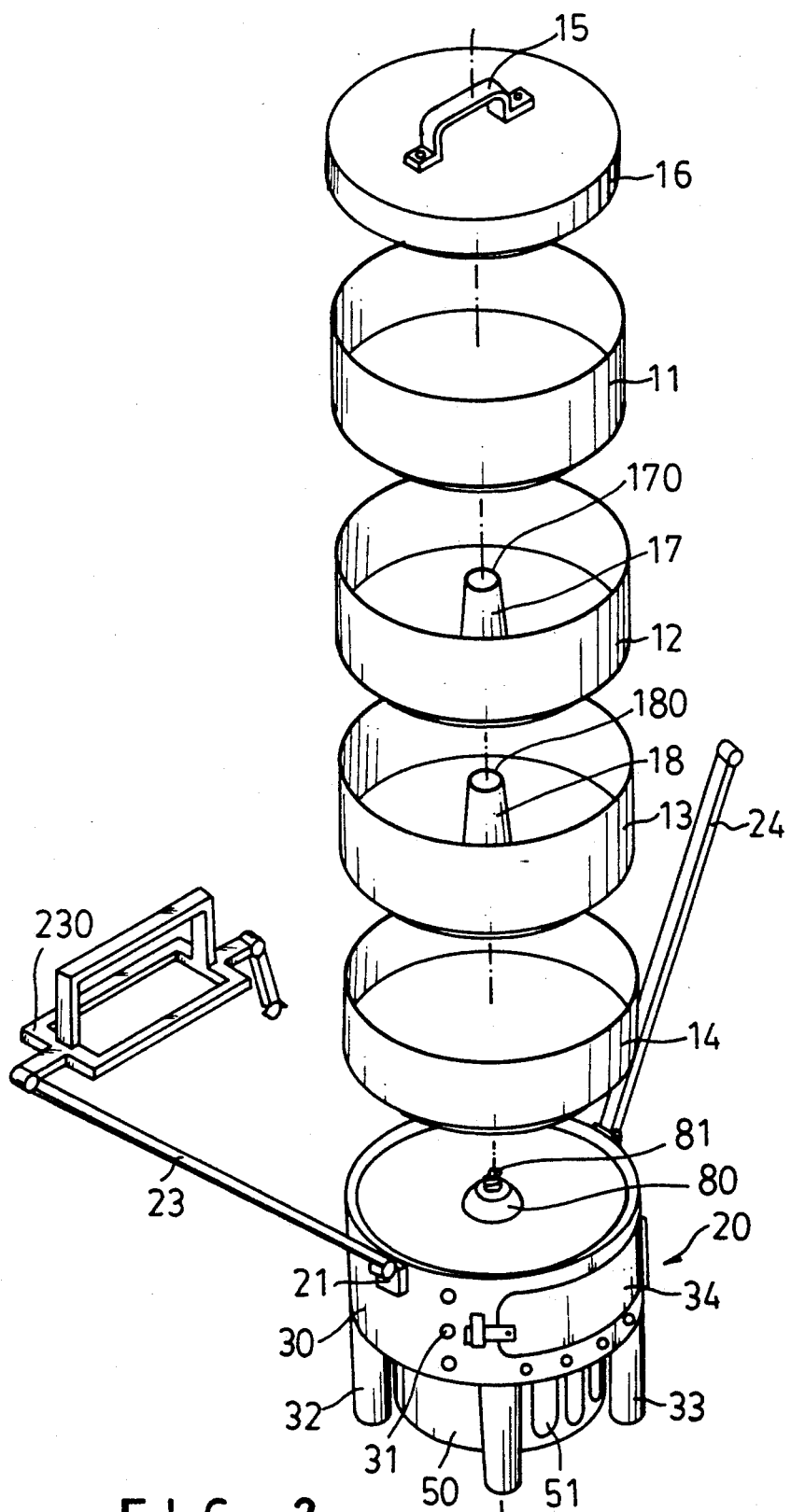
FIG. 2 is an exploded view of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 3:
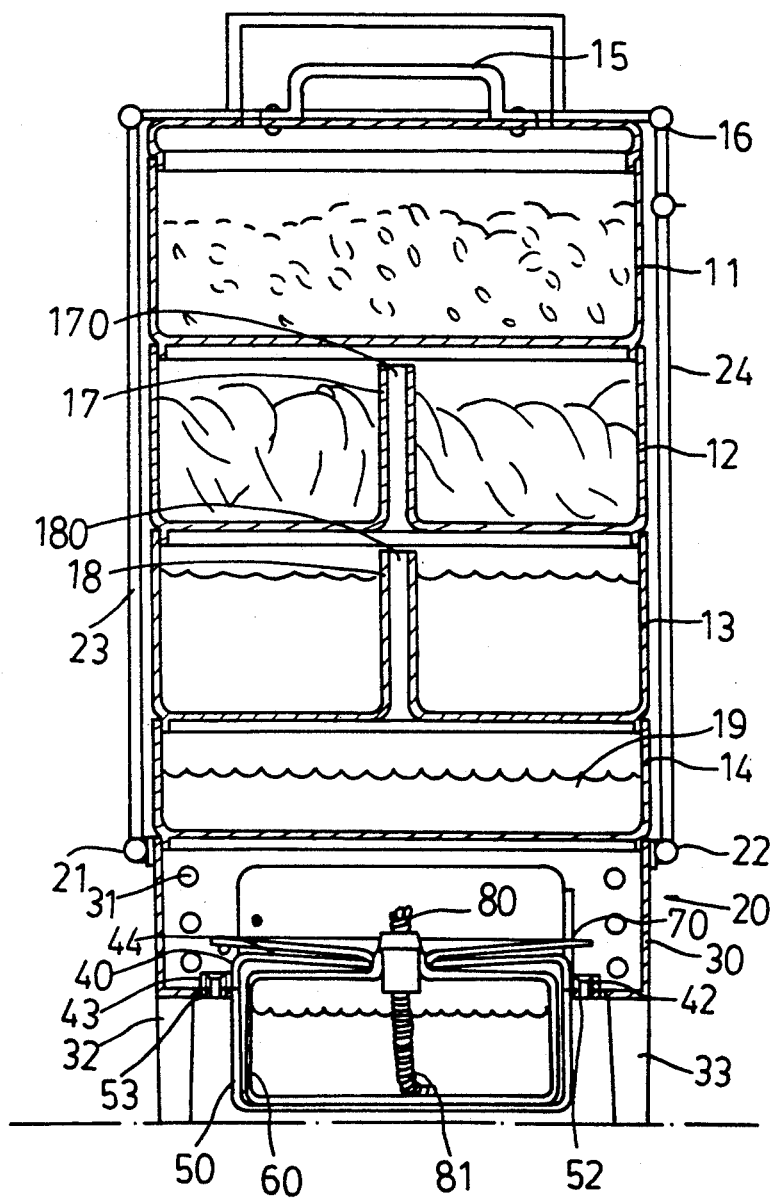
FIG. 3 is a sectional view of the present invention.

With reference to the drawings and in particular to FIGS. 1, 2 and 3 thereof, the present invention comprises a body portion 10 which has an upper container 11, an intermediate container 12, and a lower container 13. The lower container 13 is provided with a tray 14 at the bottom. Under the tray 14 there is a combustion chamber 20. The combustion chamber 20 has two lugs 21 and 22 for connecting with two rod members 23 and 24 which are used to fix the upper container 11, the intermediate container 12, the lower container 13, and the tray 14 in position. The rod members 23 and 24 is connected with a frame 230 on the top ends. Further, the upper container 11 is provided with a lid 16 with a handle 15 on the top. The intermediate container 12 and lower container 13 are provided with tubular members 17 and 18 respectively. The tubular members 17 and 18 are formed with center holes 170 and 180 which communicate the interior with the exterior of the tubular members 17 and 18 so that the steam generated from the water in the tray 14 may go upwards.

Figure 4:
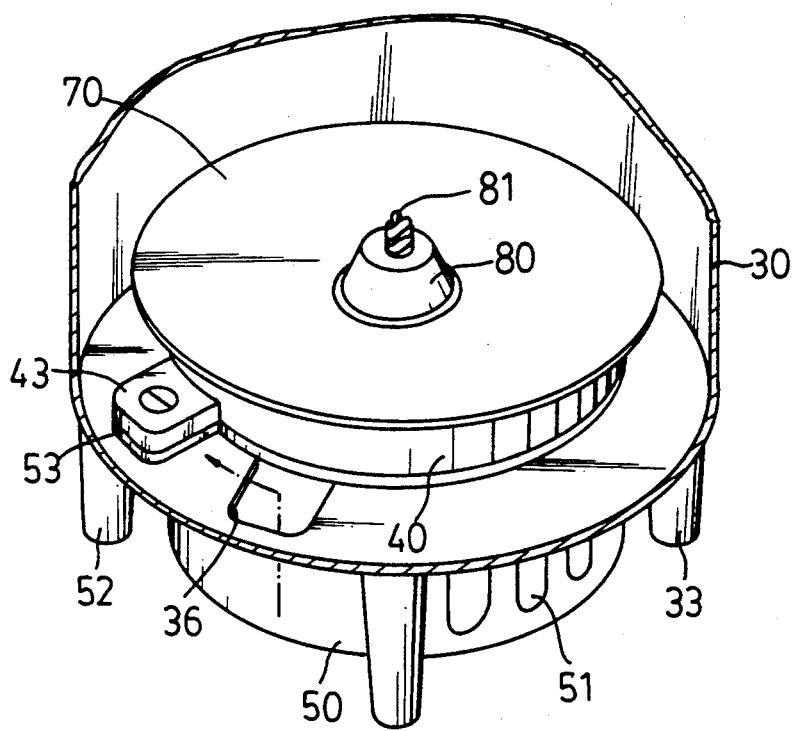
FIG. 4 shows the structure of the combustion chamber.
Figure 5:
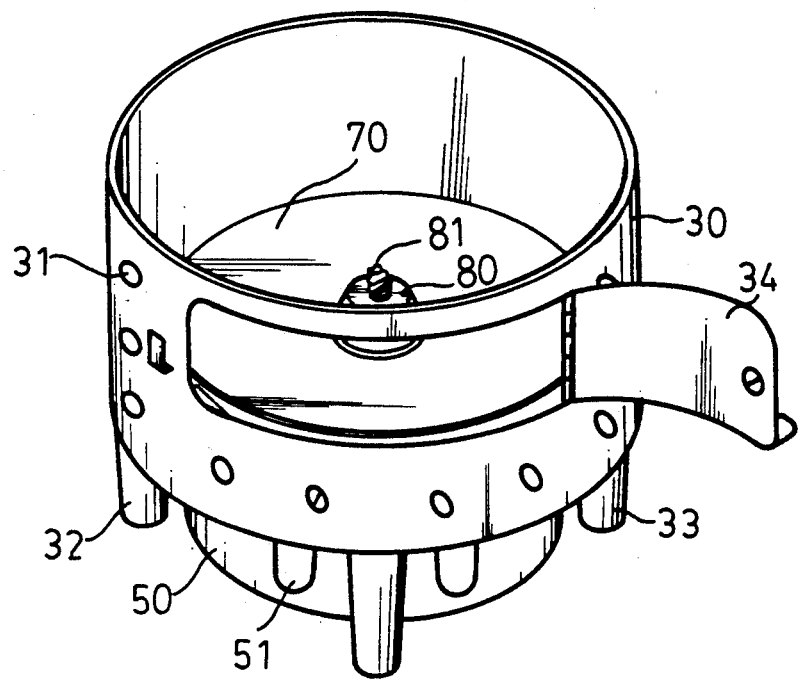
FIG. 5 is a perspective view of the combustion chamber with its cover opened.
Figure 6:
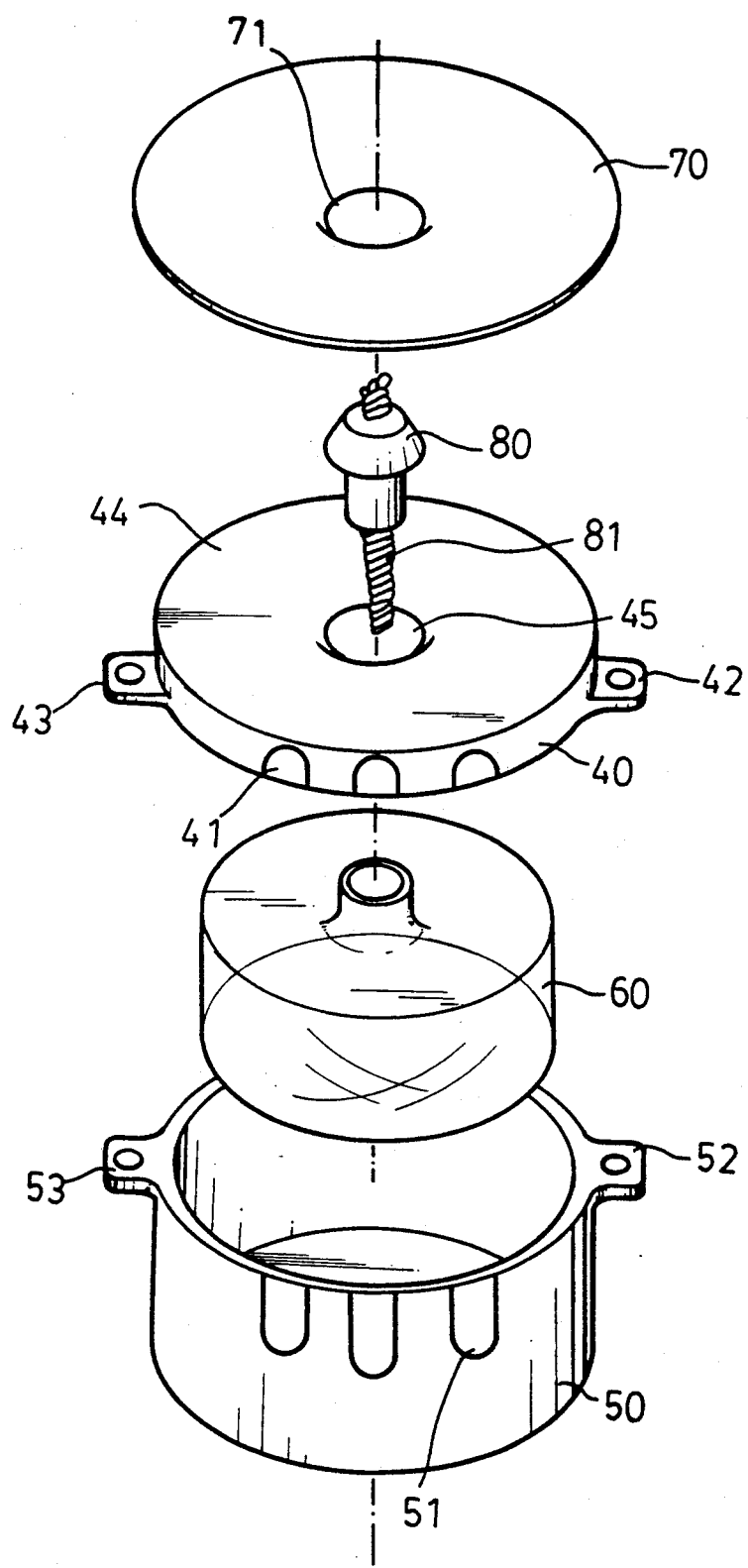
FIG. 6 is an exploded view of the combustion chamber.

Referring to FIGS. 4, 5 and 6, the combustion chamber 20 mainly comprises a body portion 30, an upper cover 40, a container 50, a grease container 60, a disc 70, and a plug 80. The body portion 30 is provided with a plurality of ventilation holes 30 and a plurality of legs 33. Further, the body portion 30 has a closable gate 34 (see FIG. 5) on its vertical side for the passage of air. The upper cover 40 is formed with a plurality of slots 41 and two lugs 42 and 43, while the container 50 has a plurality of slots 51 and two lugs 52 and 53. In addition, the body portion 30 is provided with two openings 36 which are slightly larger than the lugs 42 and 43 of the upper cover and the lugs 52 and 53 of the container 50 so that the upper cover 40 and the container 50 may be removed by aligning the lugs 42, 43, 52 and 53 with the openings 36.

The upper cover 40 is formed with a curved surface 44 on which there is a center hole 45. As may be seen in FIGS. 3 and 6, a disc 70 with a V-shaped cross section is disposed on the curved surface 44 of the upper cover 40 and has a center hole 71. Hence, the head 80 may be mounted on the disc 70, with its wick 81 extending downwardly through the center hole 45 of the upper cover 40 and the center hole 71 of the disc 70 into the grease container 60.

When in use (see FIGS. 1 and 3), the upper container 11, the intermediate container 12, the lower container 13 and the tray 14 filled with water are bound together by the rod members 23 and 24 into a cylindrical member. Then, the gate 34 of the combustion chamber 20 is opened (see FIG. 5) and the wick 81 protruded out of the head 80 is ignited. Hence, the water in the tray 14 will be gradually evaporated into steam which will be transmitted into the lower container 13 and the intermediate container 12 through the tubular members 17 and 18. In the meantime, the upper container 11 will be heated. After a certain period of time, put out the fire, loosen the rod members 23 and 24 are loosened, and the food received in the upper container 11, the intermediate container 12 and the lower container 13 are ready to serve.

The application of the present invention is too wide to be mentioned and cannot be all enumerated here in detail. It is understood that the present disclosure is made by way of example only and that numerous changes int the detail of construction and the combination of parts may be resorted to without departing from the spirit and scope of the invention as hereinafter claimed.

I claim:

1. A steam case comprising:
   an upper container provided with a lid;
   an intermediate container engaged with a bottom of said upper container and having a tubular member at the center communicating the interior with the exterior thereof;
   a lower container engaged with the bottom of said intermediate container and having a tubular member at the center communicating the interior with the exterior thereof;

a tray engaged with the bottom of said lower container;

a body portion mounted under said tray and having a plurality of legs and a closable gate;

a combustion chamber mounted within said body portion, a grease container fitted into said base, a cover mounted on the top of said base, and a disc disposed on said cover; and a rod member binding said upper container, said lid, said intermediate container, said lower container, said tray, and said combustion chamber together.

2. The steam case as claimed in claim 1, wherein the base of said combustion chamber is provided with a plurality of ventilation holes.

3. The steam case as claimed in claim 1, wherein the cover and the base of said combustion chamber are provided with lugs adapted to engage with notches of said body portion.

4. The steam case as claimed in claim 1, furthering comprising a head mounted on said disc and having a wick extending downwardly through said cover and said disc into said grease container.

* * * * *